(12) United States Patent
Kim

(10) Patent No.: US 7,467,814 B2
(45) Date of Patent: Dec. 23, 2008

(54) FLANGE

(76) Inventor: Jeong Ja Kim, 663-18, Hwajeong-dong, Dong-gu, Ulsan (KR) 682-090

( * ) Notice: Subject to any disclaimer, the term of this patent is extended or adjusted under 35 U.S.C. 154(b) by 0 days.

(21) Appl. No.: 11/813,029

(22) PCT Filed: Dec. 28, 2005

(86) PCT No.: PCT/KR2005/004612

§ 371 (c)(1),
(2), (4) Date: Jun. 28, 2007

(87) PCT Pub. No.: WO2006/073242

PCT Pub. Date: Jul. 13, 2006

(65) Prior Publication Data

US 2008/0007065 A1 Jan. 10, 2008

(30) Foreign Application Priority Data

Jan. 4, 2005 (KR) .................... 10-2005-0000458

(51) Int. Cl.
*F16L 23/02* (2006.01)
(52) U.S. Cl. ........................... 285/412; 285/405
(58) Field of Classification Search ............ 285/368, 285/405, 412
See application file for complete search history.

(56) References Cited

U.S. PATENT DOCUMENTS

| | | | | |
|---|---|---|---|---|
| 253,482 A * | 2/1882 | Mixer | ................ | 285/331 |
| 790,767 A * | 5/1905 | Walsh | ................ | 285/332.1 |
| 940,098 A * | 11/1909 | Wehrle | ................ | 285/372 |
| 1,185,487 A * | 5/1916 | Eastman | ................ | 285/119 |
| 2,262,356 A * | 11/1941 | Corey | ................ | 285/2 |
| 4,432,572 A | 2/1984 | Thalmann et al. | | |
| 4,620,732 A * | 11/1986 | Marshall | ................ | 285/368 |
| 5,437,482 A * | 8/1995 | Curtis | ................ | 285/148.13 |
| 6,276,729 B1 | 8/2001 | Sanwald et al. | | |
| 6,467,820 B1 * | 10/2002 | Albrecht et al. | ............ | 285/368 |
| 6,869,081 B1 * | 3/2005 | Jenco | ................ | 277/611 |
| 7,195,289 B2 * | 3/2007 | Matt et al. | ................ | 285/414 |
| 2003/0234541 A1 | 12/2003 | Thompson | | |
| 2006/0049635 A1 * | 3/2006 | Brazier et al. | ............ | 285/412 |

FOREIGN PATENT DOCUMENTS

JP 6-12891 2/1994

* cited by examiner

*Primary Examiner*—James M Hewitt
(74) *Attorney, Agent, or Firm*—Rabin & Berdo, PC

(57) ABSTRACT

A flange for connecting pipes. The flange includes a fixing flange and a connecting flange and a joint fastening member. Each of the fixing flange and the connecting flange has a bolt facing groove on a peripheral edge of each flange and a nut fixing groove formed adjacent to the bolt facing groove. The joint fastening member includes a screw bolt, a first fixing nut screwed to a first end of the screw bolt, and a second fixing nut screwed to a second end of the screw bolt. The first fixing nut has a joint protrusion that is inserted into the nut fixing groove of the fixing flange, and the second fixing nut has a joint protrusion that is inserted into the nut fixing groove of the connecting flange.

2 Claims, 2 Drawing Sheets

[Fig. 1] PRIOR ART
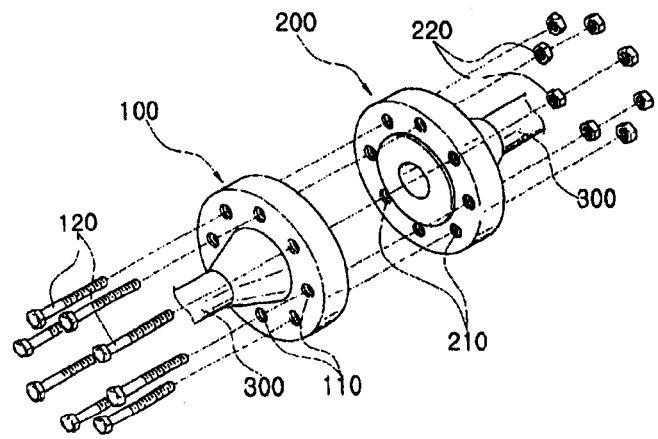
[Fig. 2]
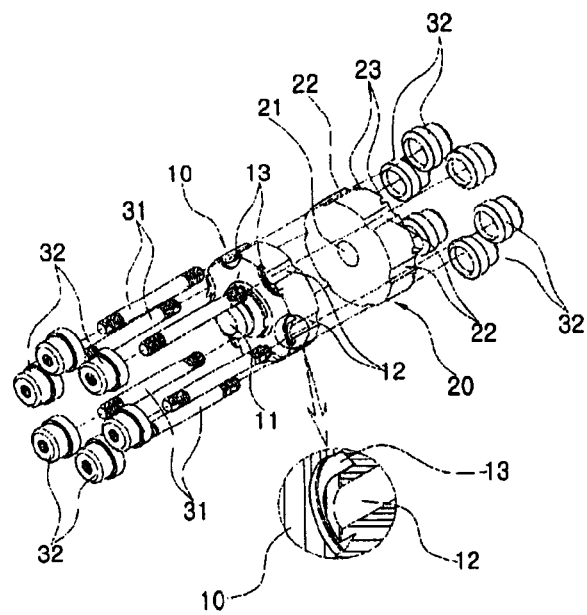
[Fig. 3]
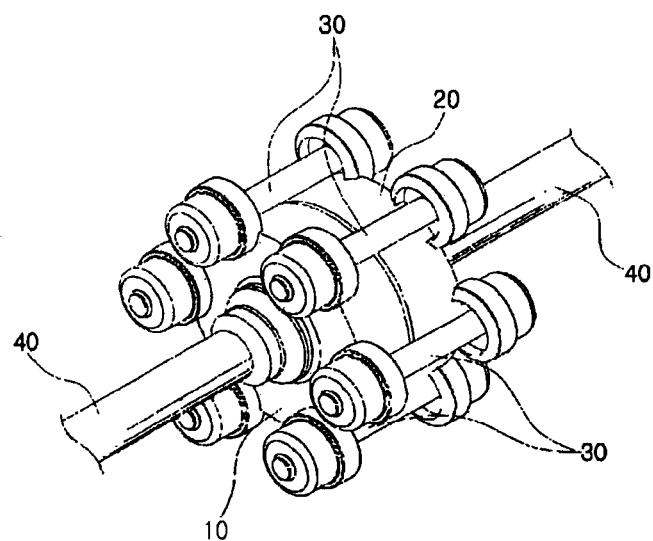

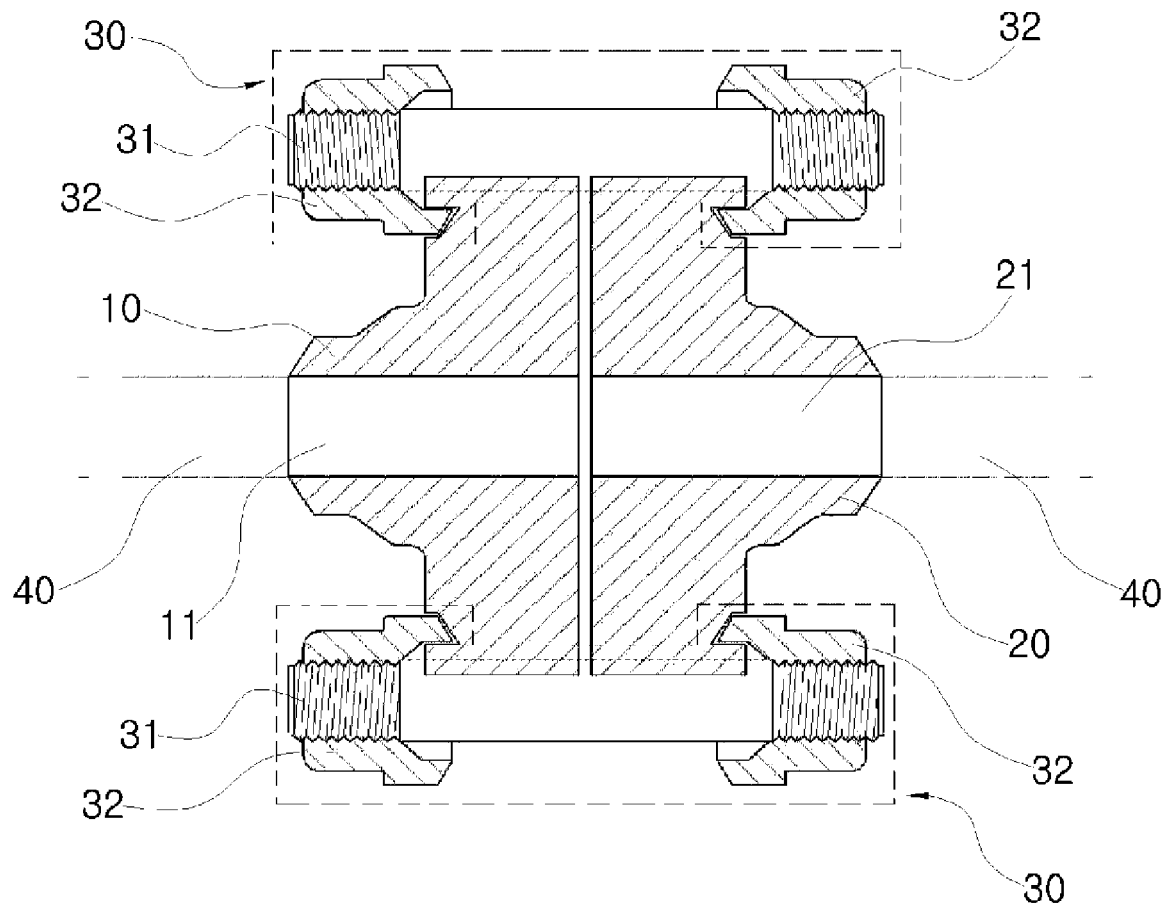
[Fig. 4]
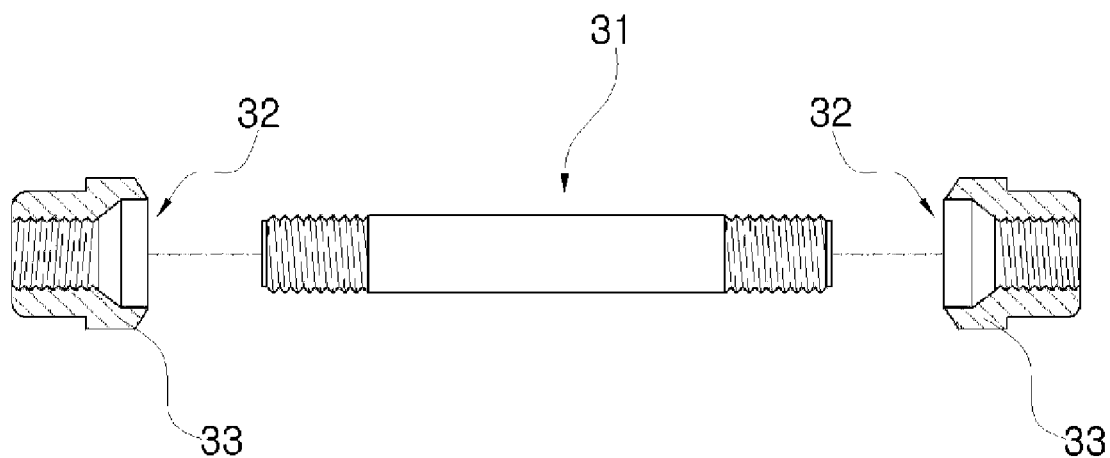
[Fig. 5]

FLANGE

TECHNICAL FIELD

The present invention relates to a flange; and more particularly, to a flange for connecting shafts or pipes facing one another.

BACKGROUND ART

A flange is generally welded along the circumference of the end of a pipe to connect pipes, valves and shafts together.

FIG. 1 is an exploded perspective view showing a conventional flange. As shown FIG. 1, the conventional flanges 100 and 200 are welded on the ends of pipes 300 that face one another. A plurality of holes 110 and 210 is formed to receive bolts 120 on the conventional flanges 100 and 200 to be near to the edge of the conventional flanges 100 and 200 at regular intervals. Therefore, the pipes 300 are connected through fastening the two flanges 100 and 200 by tightening the bolts 120 and the nuts 220 through the holes 110 and 210.

As described above, the conventional flanges 100 and 200 includes holes 110 and 210 formed to be near to the edge thereof for receiving the bolts and the nuts. The conventional flanges 100 and 200 are jointed tighter by tightening the bolts 120 and the nuts 220 through the holes 110 and 210 so as to connect the two pipes. The tightly sealed conventional flanges 100 and 200 prevent the connected pipes from being leaked although a predetermined pressure is created in the connected pipes.

That is, the conventional flanges 100 and 200 must be formed to have a wide edge to form holes 110 and 210 to receive the bolts 120 and the nuts 220. Therefore, the flanges 100 and 200 must be manufactured larger to include the wider edges and it increases the manufacturing cost thereof.

DISCLOSURE OF INVENTION

Technical Problem

It is, therefore, an object of the present invention to provide a flange for connecting pipes which has an improved structure requiring a low manufacturing cost.

Technical Solution

In accordance with one aspect of the present invention, there is a flange for connecting pipes including: a fixing flange and a connecting flange each including a pipe receiving hole having a diameter correspondent to an external diameter of pipes to connect at the center, wherein a plurality of bolt facing grooves is formed on an external edge and a nut fixing groove is formed near to each of the bolt facing grooves; and a joint fastening member for joining the fixing flange and the connecting flange with being faced one another, wherein the joint fastening member includes: a screw bolt faced to the bolt facing grooves formed on the fixing flange and the connecting flange and having both ends with screw threads formed in same direction; and fixing nuts screwed to the screw threads formed on the both ends of the screw bolt and having a joint protrusion formed the inside thereof to be corresponded to the nut fixing grooves.

Advantageous Effects

A flange for connecting pipes according to the present invention firmly joins a fixing flange and a connecting flange welded on the corresponding ends of the pipes together by firmly screwing a fixing nut on a screw bolt that is faced on bolt facing grooves formed on the fixing flange and the connecting flange until a joint protrusion of the fixing nut is inserted into a nut fixing groove formed on the fixing flange and the connecting flange. Therefore, the flange according to the present invention requires a less manufacturing cost.

BRIEF DESCRIPTION OF THE DRAWINGS

The above and other objects and features of the present invention will become apparent from the following description of the preferred embodiments given in conjunction with the accompanying drawings, in which:

FIG. 1 is an exploded perspective view of a conventional flange;

FIG. 2 is an exploded perspective view of a flange for connecting pipes according to an embodiment of the present invention;

FIG. 3 is a perspective view of the flanges shown in FIG. 2 joined together;

FIG. 4 is a cross-sectional view of the jointed flanges shown in FIG. 3; and

FIG. 5 is a cross-sectional view of the joint fastening unit shown in FIG. 3.

BEST MODE FOR CARRYING OUT THE INVENTION

Other objects and aspects of the invention will become apparent from the following description of the embodiments with reference to the accompanying drawings, which is set forth hereinafter.

FIGS. 2, 3 and 4 are an exploded perspective view, a perspective view and a cross sectional view of a flange for connecting pipes according to an embodiment of the present invention.

As shown, the flange according to the present embodiment includes a fixing flange 10 and a connecting flange 20 for connecting pipes 40 that face one another. The fixing flange 10 and the connecting flange 20 include pipe receiving holes 11 and 21, respectively. The pipe receiving holes 11 and 21 are formed at the center of the flanges 10 and 20 to have a diameter same to an external diameter of the pipes 40. The ends of the pipes 40 are inserted into the pipe receiving holes 11 and 21, respectively, and the fixing flange 10 and the connecting flange 20 are welded with the pipes 40.

The fixing flange 10 and the connecting flange 20 includes a plurality of bolt facing grooves 12 and 22 formed on external edges thereof, and nut fixing grooves 13 and 23 formed near to the bolt facing grooves 12 and 22. Joint fastening members 30 are faced to the bolt facing grooves 12 and 22 and the nut fixing grooves 13 and 23.

As described above, the fixing flange 10 and the connecting flange 20 includes the pipe receiving holes 11 and 21 to connect the pipes 40. These pipe receiving holes 11 and 21 are formed at the center of the corresponding flanges 10 and 20 by penetrating the center of the corresponding flanges 10 and 20, and the pipe receiving holes 11 and 21 have a diameter corresponding to the external diameter of the pipes 40. The ends of the pipes 40 are inserted into the pipe receiving holes 40, and the flanges 10 and 20 are welded with the pipes 40 so as the pipes 40 are connected by fastening the fixing flange 10 and the connecting flange 20 together.

The plurality of bolt facing grooves 12 and 22 are formed at the external edge of the fixing flange 10 and the connecting flange at regular intervals to be matched, correspondently.

Also, the nut fixing grooves 13 and 23 are formed to be near and parallel to the bolt facing grooves 12 and 22 on the fixing flange 10 and the connecting flange 20.

Therefore, the pipes 40 are connected by installing the joint fastening members 30 on the bolt facing grooves 12 and 22 and the nut fixing grooves 13 and 23 which are formed at the fixing flange 10 and the connecting flange 20.

That is, the jointing fastening member 30 joins the fixing flange 10 and the connecting flange 20 which are welded with the pipes 40.

As shown in FIG. 5, the joint fastening member 30 includes a screw bolt 31 faced on the bolt facing grooves 12 and 22 formed on the fixing flange 10 and the connecting flange 20; and fixing nuts 32 fixed at the nut fixing groove 13 and 23 with being screwed on the both ends of the screw bolt 31 for pressurizing the flanges 10 and 20 together so as to firmly fastening the flanges 10 and 20 together.

The screw bolt 31 is a bolt faced at the bolt facing grooves 12 and 22 of the fixing flange 10 and the connecting flange 20 which are sealed together with faced one another. Screw thread is formed on both ends of the screw bolt 31 in a same direction.

Therefore, if the fixing nut 32 is screwed to screw bolt 31 by rotating the fixing nut 32 in an opposite direction after the screw bolt 31 is faced on the bolt facing groove 12 and 22, the fixing nut 32 is caught on the nut fixing grooves 13 and 23. As a result, the fixing nut 32 is firmly screwed with the screw bolt 31 and the flanges 10 and 20 being tightly jointed.

The fixing nut 32 is a nut screwed at the screw thread formed on the both ends of the screw bolt 31. The screw thread is formed on the inside surface of the hollow of the fixing unit 32 to be correspondent to the screw thread formed on the screw bolt 31 so that the fixing nut 32 is screwed to the both ends of the screw bolt 31.

The fixing nut 32 includes a joint protrusion 33. The joint protrusion 33 is formed on the inside surface of the fixing nut 32 and is projected internally. The joint protrusion 33 is inserted into the nut fixing grooves 13 and 22 formed on the fixing flange 10 and the connecting flange 20 when the fixing nut 32 is screwed at the screw bolt 31.

Therefore, the joint protrusion 33 guides the fixing nut 32 to be inserted into the nut fixing grooves 13 and 23 when the fixing flange 10 and the connecting flange 20 are jointed together. Therefore, the joint protrusion 33 enhances the jointing force thereof.

Hereinafter, a method of installing the flange for connecting pipes according to the present embodiment will be described with reference FIGS. 2 and 5.

In order to connect the pipes 40, the fixing flange 10 and the connecting flange 20 are joined together to match the bolt facing grooves 12 and 22, correspondently. Then, the outer surface of the screw bolt 31 is faced on the bolt facing grooves 12 and 22.

After the outer surface of the screw bolt 31 is faced on the bolt facing grooves 12 and 22 formed on the fixing flange 10 and the connecting flange 20, the fixing nuts 32 are screwed at the both ends of the screw bolt 31. That is, the fixing nuts 32 are rotated in the opposite direction. As a result, the fixing nuts 32 are screwed in the inner direction of the screw bolt 31.

Then, the joint protrusion 33 of the fixing nut 32 is guided into the nut fixing grooves 13 and 23 formed at the fixing flange 10 and the connecting flange 20. As a result, the fixing nut 32 firmly joins the fixing flange 10 and the connecting flange 20 by being guided through the joint protrusion 33.

While the present invention has been described with respect to certain preferred embodiments, it will be apparent to those skilled in the art that various changes and modifications may be made without departing from the scope of the invention as defined in the following claims.

The invention claimed is:

1. A flange assembly for connecting pipes, comprising:
  a fixing flange and a connecting flange, each flange including a pipe receiving hole for receiving a pipe therein, the pipe receiving hole having a diameter that corresponds to an external diameter of the received pipe, the pipe receiving hole being formed at the center of the fixing flange and the connecting flange, each flange including a bolt facing groove on a peripheral edge of each flange and a nut fixing groove formed adjacent to the bolt facing groove, the nut fixing groove, taken from a plan view of each flange, being spaced apart from the bolt facing groove; and
  a joint fastening member for joining the fixing flange and the connecting flange,
  wherein the joint fastening member includes:
  a screw bolt contacting an inner surface of the bolt facing groove formed on the fixing flange and contacting an inner surface of the bolt facing groove formed on the connecting flange, the screw bolt having a first end and a second end, each end being threaded in same direction; and
  a first fixing nut screwed to the first end of the screw bolt, and a second fixing nut screwed to the second end of the screw bolt, the first fixing nut having a joint protrusion that is inserted into the nut fixing groove of the fixing flange, the second fixing nut having a joint protrusion that is inserted into the nut fixing groove of the connecting flange.

2. The flange of claim 1, wherein each nut fixing groove is configured to receive only a portion of the joint protrusion, which is less than all of the joint protrusion, such that, when said portion of the respective joint protrusion is received in the nut fixing groove, a remaining portion of the joint protrusion that is not received by the nut fixing groove, is disposed outside a periphery of the respective flange.

* * * * *